Sept. 5, 1961 G. M. SOMMER ET AL 2,998,872
CLUTCHES
Filed Sept. 2, 1958 5 Sheets-Sheet 1

INVENTORS:
GORDON M. SOMMER
JOHN LIU
BY Marshall, Johnston,
Cook & Root
ATT'YS

Sept. 5, 1961  G. M. SOMMER ET AL  2,998,872
CLUTCHES

Filed Sept. 2, 1958  5 Sheets-Sheet 5

INVENTORS:
GORDON M. SOMMER
JOHN LIU
BY Marshall, Johnston,
Cook & Root
ATT'YS

United States Patent Office 2,998,872
Patented Sept. 5, 1961

2,998,872
CLUTCHES
Gordon M. Sommer, Hinsdale, and John K. Liu, Chicago, Ill., assignors to U. S. Industries, Inc., New York, N.Y., a corporation of Delaware
Filed Sept. 2, 1958, Ser. No. 758,433
2 Claims. (Cl. 192—18)

This invention relates to clutches and, more particularly, to clutches which may be afforded in the form of a self-contained unit for driving machinery such as mechanical presses, conveyors, power screws, and the like.

It is a primary object of this invention to afford a novel clutch operable to quickly and efficiently connect and disconnect driven members and driving members relative to each other.

Clutches of the general nature to which the present invention pertains have been heretofore known in the art, but have commonly had several inherent disadvantages such as, for example: being large and bulky in size; being ineffective and inefficient in operation; not being positive and reliable in operation; being difficult to repair and replace; being complicated in construction and operation; being built into the machinery with which they were used, rather than constituting a readily accessible and removable accessory therefor, and the like. It is an important object of this invention to overcome such disadvantages.

Another object is to afford a novel clutch of the aforementioned type embodying novel control mechanism therefor.

Another object is to provide a novel clutch embodying a driven shaft which may be intermittently connected to a constantly rotating drive shaft in a novel and expeditious manner.

A further object of the present invention is to enable a novel clutch of the aforementioned type to be constructed in a manner whereby an oiltight housing is afforded in which the working parts therein may be bathed in oil during operation of the clutch.

Another object of the present invention is to afford a novel clutch of the aforementioned type embodying novel fluid-actuated control means therefor constituted and arranged in a novel and expeditious manner.

A further object is to provide a novel clutch embodying as a part thereof axially aligned driving and driven shafts with connecting mechanism movable axially of the shafts for coupling and uncoupling the shafts in a novel and expeditious manner.

Other and further objects of the present invention will be apparent from the following description and claims and are illustrated in the accompanying drawings which, by way of illustration, show the preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

Figure 1:
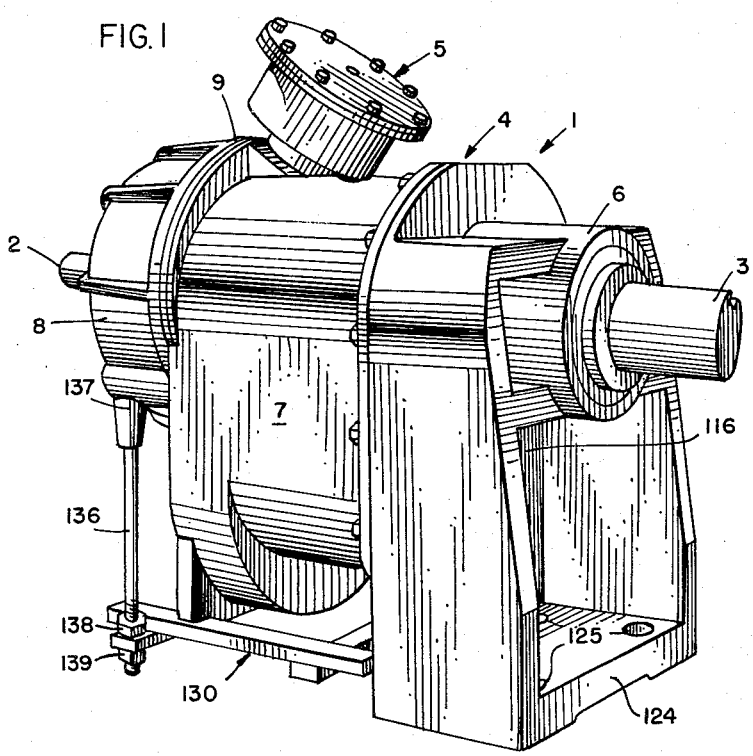
FIG. 1 is a perspective view of a transmission unit or clutch embodying the principles of our invention.

A clutch or transmission unit 1, embodying the principles of our invention, is shown in the drawings to illustrate the preferred embodiment of our invention.

As may be seen in FIG. 1, the clutch 1 constitutes a self-contained unit which includes a drive shaft 2 and a driven shaft 3 rotatably mounted in, and projecting outwardly from, opposite ends of a housing 4. A fluid motor 5 is mounted on top of the housing 4 for actuating the clutch 1 and thereby couple the driven shaft 3 to, and uncouple the driven shaft 3 from, the drive shaft 2, as will be discussed in greater detail presently.

Figure 2:
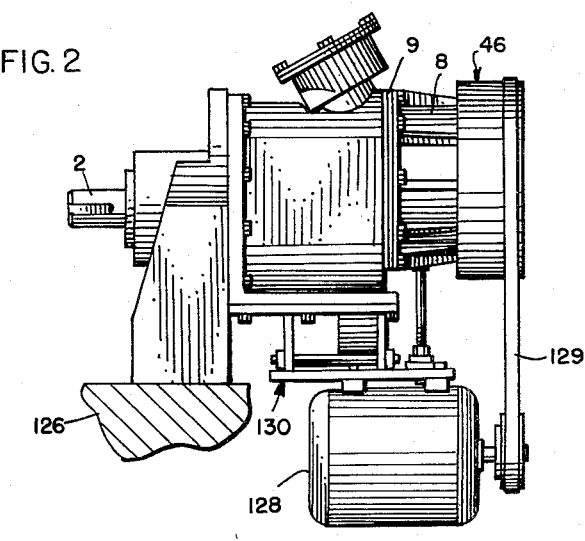
FIG. 2 is a side elevational view of the transmission unit shown in FIG. 1.
Figure 3:
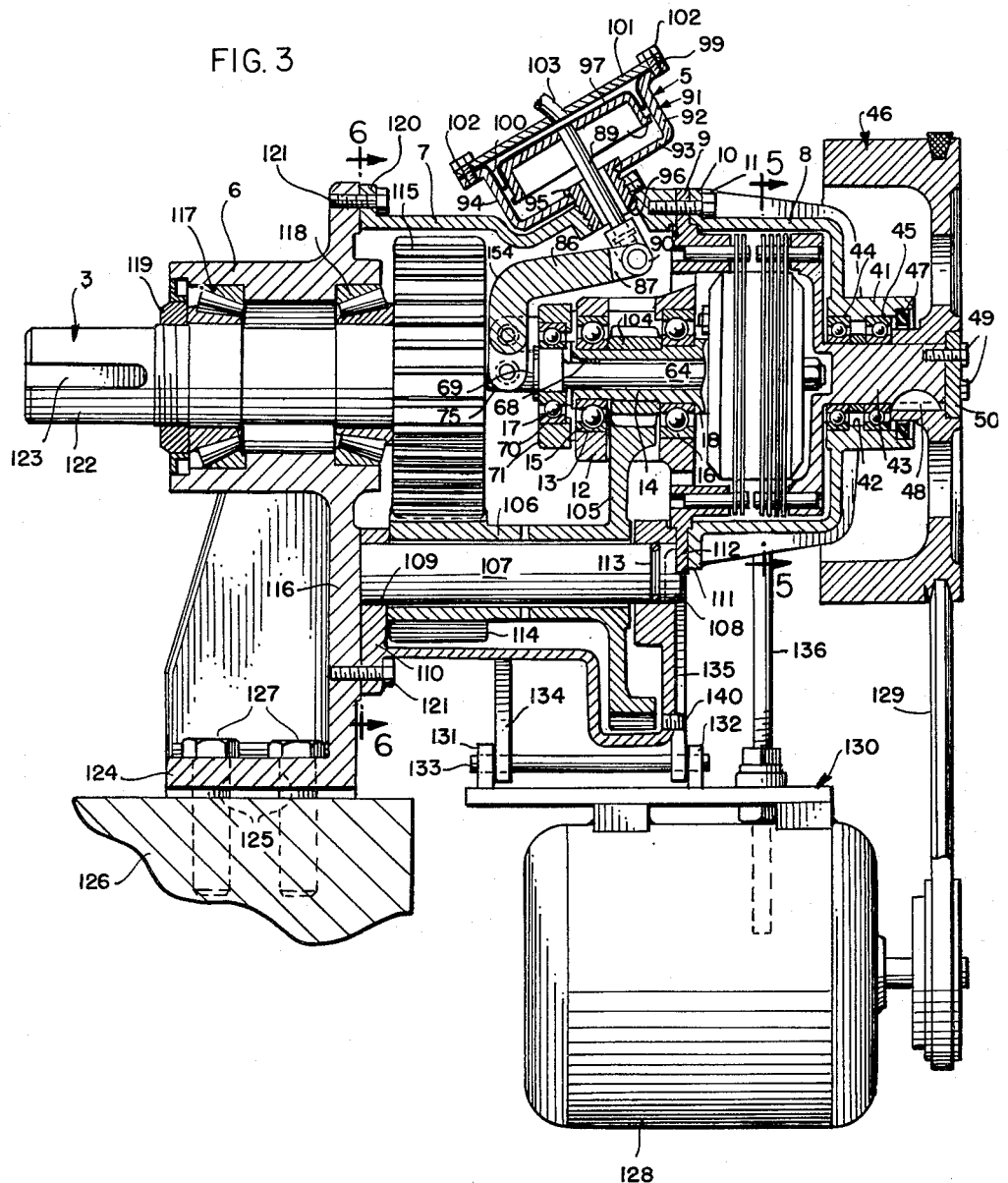
FIG. 3 is a longitudinal sectional view of the transmission unit shown in FIG. 2.

As may best be seen in FIGS. 1, 2 and 3, the housing 4 of the clutch or transmission unit 1 is preferably made in four sections, namely, a front section 6, a main body section 7, a rear section 8, and an intermediate partition wall 9. The rear section 8 has an annular outwardly projecting flange 10 and is secured to the main body section 7 by a plurality of bolts 11 extending through the flange 10 in spaced relation therearound and threadedly engaged in the rear end portion of the main body section 7. The intermediate partition wall 9 is disposed between the main body section 7 and the rear section 8 and is clampingly engaged thereby, the bolts 11, which secure the sections 7 and 8 together, extending through the outer edge portion of the partition wall 9.

The partition wall 9 has a centrally disposed forwardly projecting hub portion 12 having a horizontally extending opening 13 therein, and a drive shaft 14 extends through and is journalled in bearings 15 and 16 in the opening 13, FIG. 3. The drive shaft 14 is held against longitudinal displacement relative to the hub 12 by a retaining ring 17 and a shoulder 18 on the drive shaft 14, which are engaged with the front bearing 15 and the rear bearing 16, respectively, FIGS. 3 and 4.

Figure 4:
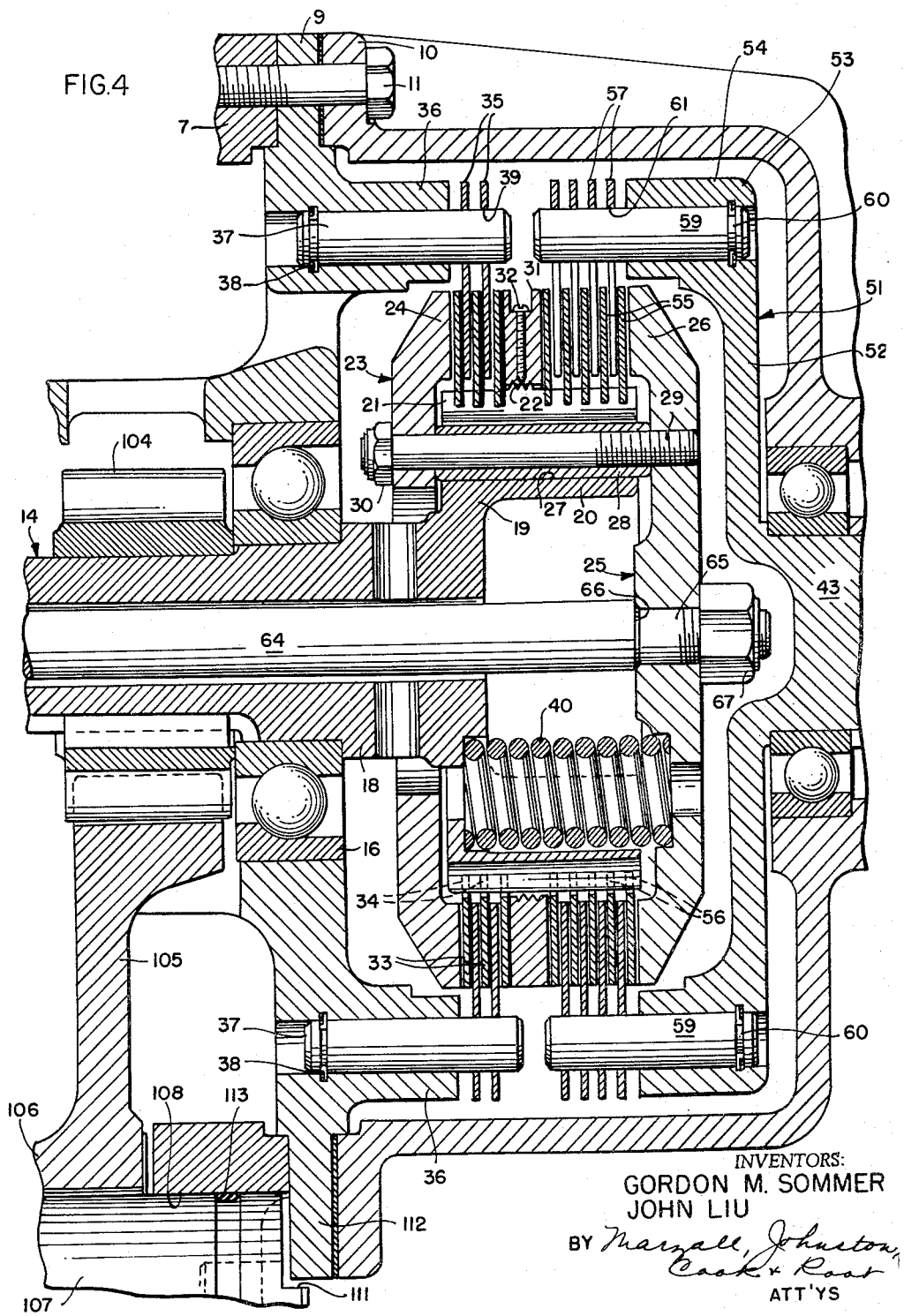
FIG. 4 is an enlarged detail sectional view of a portion of the transmission unit shown in FIG. 3.

The shaft 14 has an enlarged head 19 formed on the rear end portion thereof, FIG. 4. The head 19 is of cup-shaped, rearwardly convex formation and embodies a rearwardly projecting annular-shaped outer flange 20. The flange 20 has a plurality of splines 21 formed in the outer peripheral surface thereof, the splines 21 extending in an axial direction relative to the shaft 14. A threaded, radially outwardly projecting annular portion 22 is formed on the outer surface of the flange 20 substantially intermediate of the length of the splines 21 for a purpose which will be discussed in greater detail presently.

A substantially annular-shaped collar 23 is disposed around the shaft 14 between the enlarged head 19 and the partition wall 9, and has a rearwardly projecting shoulder 24 formed along its outer peripheral edge and disposed radially outwardly of the front end portion of the flange 20 on the head 19.

A substantially circular-shaped plate 25 is disposed rearwardly of the shaft 14, in axial alignment therewith, and has an annular, forwardly projecting shoulder 26 formed along its outer peripheral edge, the shoulder 26 being disposed radially outwardly of the rear end portion of the flange 20 on the head 19.

Figure 5:
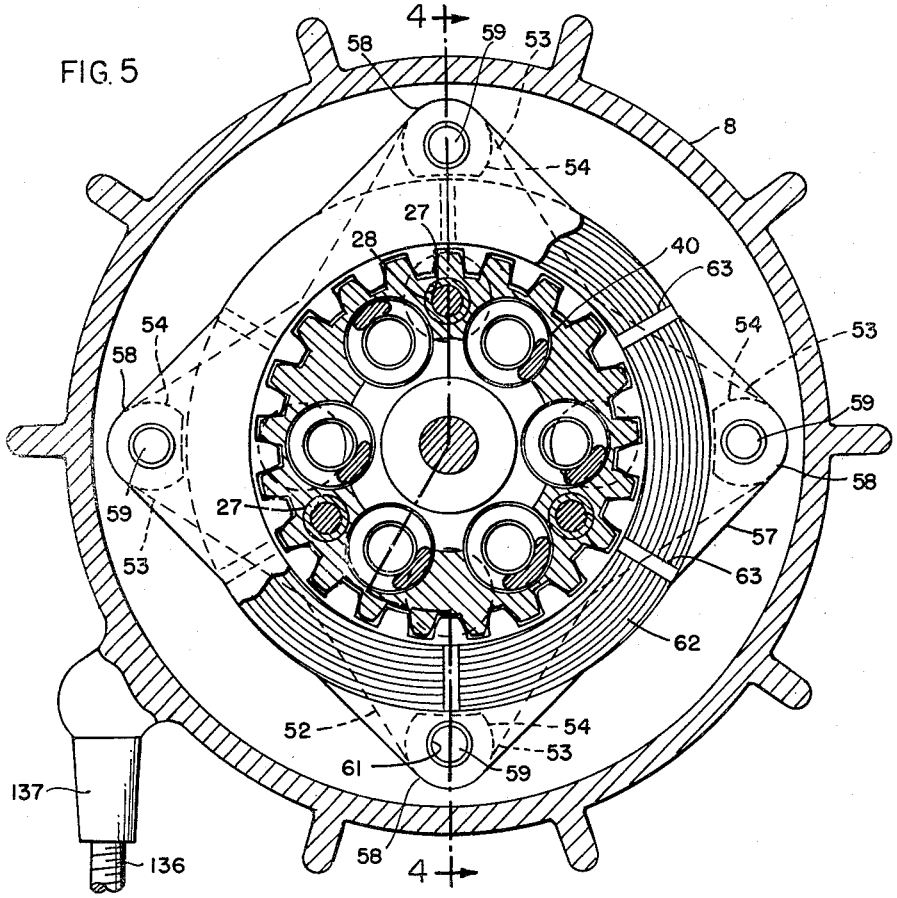
FIG. 5 is an enlarged sectional view taken substantially along the line 5—5 in FIG. 3.

A plurality of openings 27 extend through the flange 20 on the head 19 and are spaced from each other therearound, FIGS. 4 and 5. Elongated, substantially cylindrical-shaped spacers 28 are slidably mounted in and extend through respective ones of the openings 27 in the flange 20 between the collar 23 and the plate 25. The spacers 28 are longer than the thickness of the flange 20, axially of the shaft 14, so that they may project axially outwardly of the openings 27 both forwardly and rearwardly of the flange 20.

A plurality of bolts 29, having enlarged heads 30, extend through the collar 23 and respective ones of the spacers 28 and are threadedly engaged in the plate 25 in position to clamp the collar 23 and the plate 25 firmly against front and rear ends of the spacers 28, respectively.

An internally threaded ring 31 is mounted on and threadedly engaged with the intermediate threaded portion 22 on the flange 20. It will be seen that the ring 31 may be adjusted to various positions on the flange 20, axially of the shaft 14, by rotating it relative to the threaded portion 22. A screw 32 extends radially inwardly through the ring 31 and is threadedly engaged therein, and may be turned inwardly into abutting engagement with the flange 20 to thereby hold the ring 31 in adjusted position thereon.

A plurality of annular-shaped, internally splined brake rings 33 having splines 34 thereon are mounted on the flange 20, forwardly of the ring 31, with the splines 34 engaged with the splines 21 on the flange 20. A plurality of substantially square, flat brake rings 35, having an inside diameter greater than the outside diameter of the flange 20, are disposed around the flange 20, with each of the brake rings 35 disposed between a respective pair of the brake rings 33. As shown in the drawings, three brake rings 33 are mounted on the flange 20, and two brake rings 35 are mounted around the flange 20. However, as will be appreciated by those skilled in the art, this is merely by way of illustration and not by way of limitation and a greater number of brake rings 33 and 35 may be embodied in a transmission unit such as our novel transmission unit 1 without departing from the purview of the present invention.

Four equally spaced, rearwardly projecting bosses 36 are formed on the partition wall 9 around the drive shaft 14, and four pins 37 are mounted in respective ones of the bosses and project rearwardly therefrom. The pins 37 are held in the bosses 36 against longitudinal displacement therefrom by snap rings 38, and each one of the pins 37 extend through an opening 39 in a respective corner of the plates 35.

The plates 35 are freely slidably mounted on the pins 37, and the rings 33 are freely slidably mounted on the flange 20 for axial movement relative to the shaft 14. Hence, it will be seen that upon rearward movement of the collar 23, the shoulder 24 thereof may be effective to clamp the rings 33 and 35 between the shoulder 24 and the ring 31. The brake rings 35 being held against rotation by the pins 37, and the brake rings 33 being secured to the flange 20 on the shaft 14 for rotation therewith, such clamping of the brake rings 33 and 35 between the shoulder 24 and the ring 31 is effective to hold the drive shaft 14 against rotation in the housing 4.

A plurality of compression coil springs 40, FIGS. 4 and 5, are disposed between the head 19 and the plate 25 in position to yieldingly urge the plate 25 and, therefore, the collar 23 rearwardly relative to the shaft 14, and are normally effective to hold the collar 23 in such position as to effectively clamp the rings 33 and 35 between the shoulder 24 and the ring 31 to thereby hold the shaft 14 against rotation.

As may be seen in FIG. 3, the rear section 8 of the housing 4 has a centrally disposed, rearwardly projecting hub portion 41, having an opening 42 extending therethrough in axial alignment with the shaft 14. Another shaft 43 is journalled in bearings 44 and 45 in the opening 42, the shaft 43 extending through the opening 42. A flywheel 46 is shown mounted on the rear end portion of the shaft 43 of our novel transmission unit 1 outwardly of the hub 41, FIGS. 2 and 3, and an oil seal 47 is disposed between the flywheel 46 and the rear end portion of the hub 41 to prevent leakage of oil outwardly from the housing 4. The flywheel 46 is secured to the shaft 43 for rotation therewith by suitable means such as a key 48 and is secured to the shaft 43 against axial displacement therefrom by bolts 49 extending through a retaining plate 50 and threadedly engaged in the rear end of the shaft 43, the retainer plate 50 being abuttingly engaged with the rear face of the flywheel 46.

The shaft 43 has an enlarged head 51 formed on the front end portion thereof and disposed forwardly of the hub 41 on the rear section 8 of the housing 4. The head 51 on the shaft 43 has a substantially flat plate-shaped body portion 52 having four equally spaced outer corners 53, and four bosses 54 are formed on and project forwardly from respective ones of the corners 53 in radially outwardly overlying relation to the plate 25, FIGS. 4 and 5.

A plurality of annular-shaped, internally splined clutch rings 55, having splines 56, are mounted on the rear end portion of the flange 20 of the head 19, with the splines 56 engaged with the splines 21 so that the clutch rings 55 are rotatable with the head 19. A plurality of other clutch rings 57, which have an inside diameter greater than the outside diameter of the flange 20 are disposed around the flange 20, with each of the clutch rings 57 disposed between a respective pair of the clutch rings 55. The clutch rings 57 are in the form of flat, substantially square-shaped plates, having four equally spaced corners 58 which are disposed in parallel, horizontally spaced relation to the bosses 54 on respective corners 53 of the plate member 51, FIGS. 4 and 5.

A plurality of pins 59 are mounted in the bosses 54 with each pin 59 held in its respective boss 54 by a snap ring 60. The pins 59 project forwardly from the bosses 54 and extend through openings 61 in respective ones of the corners 58 of the clutch rings 57.

In the drawings, the transmission unit 1 is shown as embodying six clutch rings 55 and five clutch rings 57, FIG. 4. However, it will be appreciated by those skilled in the art that this is merely by way of illustration and not by way of limitation and that a greater number of rings 55 and 57 may be used without departing from the purview of our invention.

Preferably, the brake rings 33 and the clutch rings 55 are of the same size and construction, and have the same outside diameter as the collar 23 and the plate member 25. Each of the rings 33 and 55 has spiral grooves 62 formed in the front and rear faces thereof and extending transversely thereacross to afford passageways for oil, to lubricate and cool the rings 33 and 55 and the friction surfaces with which they are in contact during operation of our novel transmission unit 1. The rings 33 and 55 also have radially extending grooves 63 formed in the front and rear faces thereof, the grooves 63 extending transversely across the rings 33 and 55 from the inner to the outer peripheral edges thereof and affording additional passageways for the passage of oil therethrough.

Also, the brake rings 35 and the clutch rings 57 are preferably of the same size and construction, each being substantially square in outside shape and having an inside diameter equal to the inside diameters of the shoulders 24 and 26 on the collar 23 and the plate member 25, respectively, FIGS. 4 and 5. The rings 35 and 57 preferably have smooth and flat front and rear faces, each of which it will be remembered is disposed adjacent to one of the grooved faces of one of the brake rings 33 or clutch rings 55, respectively.

The collar 23 and the plate member 25 and the ring member 31, are so positioned relative to each other that when the collar 23 and the plate member 25 are disposed in the position shown in solid lines in FIG. 4, the rear face of the shoulder 24 on the collar 23 is disposed so closely adjacent to the ring member 31 as to be effective to clamp the ring members 33 and 35 between the shoulder 24 and the ring 31 with sufficient force to hold the shaft 14 against rotation. At this same time, the shoulder 26 on the plate member 25 is disposed a sufficient distance away from the ring 31 that no clamping force is exerted by the shoulder 26 and the ring 31 on the clutch rings 55 and 57 so that the clutch rings 55 and 57 are free to rotate relative to each other and, hence, the drive shaft 43 is free to rotate relative to shaft 14.

Likewise, the aforementioned spacing between the collar 23, the plate member 25, and the ring 31 is such that when the collar 23, the plate member 25, the bolts 29, and the spacers 28 are moved forwardly as a unit relative to the head 19 into position to dispose the collar 23 in forwardly disposed position relative to that shown in FIG. 4, the shoulder 26 on the plate member 25 is disposed so closely adjacent to the ring 31 as to be effective to clamp the clutch rings 55 and 57 between the shoulder 26 and the ring 31 with sufficient force to mechanically connect the shaft 14 to the shaft 43 for rotation therewith. At this same time, the aforementioned movement of the collar 23 and the plate member 25 forwardly, or to the left as viewed in FIG. 4, is effective to move the shoulder 24 a sufficient distance away from the ring 31 that no clamping force is exerted by the shoulder 24 and the ring 31 on the brake rings 33 and 35, so that the shaft 14 is free to rotate with the drive shaft 43.

In our transmission unit 1, we have afforded a novel mechanism for effecting the aforementioned forward movement of the collar 23 and the plate member 25. This mechanism includes an elongated, straight rod 64 which extends through, and is slidably mounted in the shaft 14, and has a threaded rear end portion 65 which extends through the center of the plate member 25. The threaded end portion 65 of the rod 64 is of smaller cross-sectional size than the adjacent portion thereof to thereby afford a rearwardly facing shoulder 66 on the rod 64 adjacent to the threaded end portion 65 thereof. A nut 67 is mounted on the threaded end portion 65 rearwardly of the plate member 25 and in juxtaposition to the rear face thereof, and is effective to firmly clamp the plate member 25 against the shoulder 66. Throughout most of its length, the rod 64 is disposed in spaced relation to the hollow shaft 14, and it is supported in such position by the engagement of the threaded end portion 65 with the plate 25 and a bearing 68 disposed in the front end portion of the shaft 14, FIGS. 3 and 4.

Figure 7:
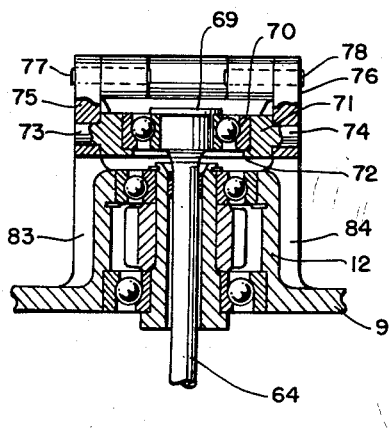
FIG. 7 is a detail sectional view taken substantially along the line 7—7 in FIG. 6.

At its front end portion, the rod 64 has an enlarged head 69, FIGS. 3 and 7. The front end portion of the rod 64 is journalled in a suitable bearing 70 in a thrust collar 71, FIGS. 3 and 7, with the head 69 disposed forwardly of and in juxtaposition to the front face of the bearing 70. The thrust collar 71 has an inwardly projecting shoulder 72 at its inner front edge portion which is disposed in engagement with the rear face of the bearing 70 to thereby hold the bearing 70 against axial displacement rearwardly of the collar 71.

Figure 6:
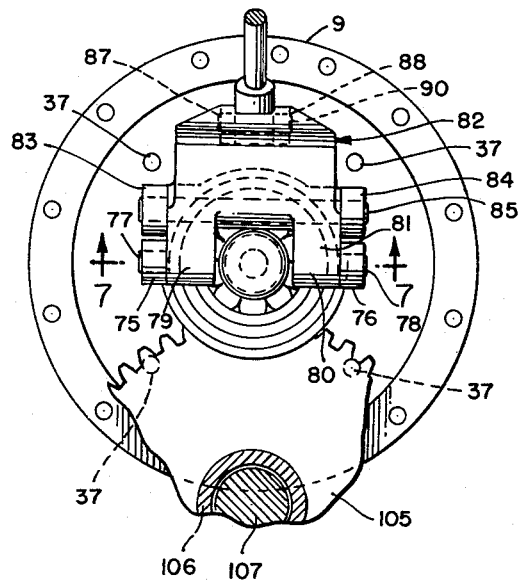
FIG. 6 is a detail sectional view taken substantially along the line 6—6 in FIG. 3, with certain parts removed to show underlying parts.

The thrust collar 71 has two outwardly projecting diametrically opposed pins or trunnions 73 and 74, which project horizontally outwardly therefrom, FIGS. 3 and 7. Two links 75 and 76 are mounted on the pins 73 and 74 and project forwardly therefrom, FIGS. 3, 6 and 7. The forward end portions of the links 75 and 76 are pivotally connected by pins 77 and 78 to the legs or branches 79 and 80, respectively, of the bifurcated lower end portion 81 of a bell crank lever 82. From the pins 77 and 78, the bell crank lever 82 projects upwardly between two ears 83 and 84 which form a part of, and project forwardly from, the hub portion 12 of the partition wall 9. A pin 85 extends through the ears 83 and 84 and the bell crank lever 82 to thereby pivotally support the bell crank lever 82 from the ears 83 and 84 at a point disposed above the connection of the lower end portion 81 of the lever with the links 75 and 76.

Figure 8:
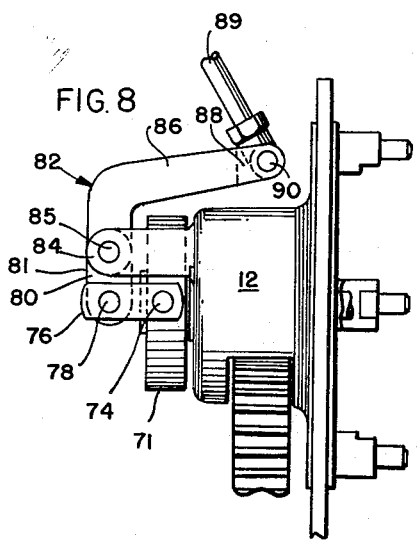
FIG. 8 is a detail side elevational view of the portion of the mechanism shown in FIG. 6.

The bell crank lever 82 is substantially L-shaped, FIGS. 3 and 8, with the lower end portion 81 normally disposed in substantially upright position, and with the upper end portion 86 projecting upwardly and rearwardly therefrom. The free end portion of the upper end portion 86 is also bifurcated in form having two branches or legs 87 and 88, and the lower end of the piston rod 89 of the fluid motor 5 is disposed between the legs 87 and 88 and pivotally connected thereto by a pin 90.

The fluid motor 5 embodies a housing 91 having a substantially cup-shaped housing 92 including a bottom wall 93 and a substantially cylindrical-shaped side wall 94. An externally threaded sleeve 95 extends outwardly through, and is secured to the bottom wall 93 and is threadedly engaged in an opening 96 in the upper portion of the main body section 7 of the housing 4 of the transmission unit 1, FIGS. 2 and 3.

The piston rod 89 extends upwardly from the bell crank lever 82 through the sleeve 95 into the housing 91, and at its upper end portion has a piston head 97 thereon which is substantially of cylindrical, inverted cup-shaped formation. At its lower edge portion, the piston 97 has a radially outwardly projecting annular flange 98 which is of such size that it fits relatively snugly, but with a freely slidable fit, in the side wall 94 of the housing 91.

The side wall 94 of the housing 91 has a radially outwardly projecting flange 99 on its upper edge portion, and a distensible diaphragm 100 is mounted on the flange 99 in covering relation to the upper end portion of the side wall 94. A cover plate 101 is disposed over the diaphragm 100 and is secured to the flange 99 by suitable means such as bolts 102 to thereby firmly clamp the outer peripheral edge portions of the diaphragm 100 between the cover plate 101 and the flange 99.

The diaphragm 100 may be made of any suitable material such as, for example, suitable polymerized chloroprene rubber, such as that commonly known as "neoprene," and is preferably of such form that when the piston head 97 is disposed in fully raised position, the diaphragm 100 is disposed thereon in closely overlying position and hangs downwardly between the side wall 94 and the portion of the piston head 97 disposed above the flange 98, FIG. 3.

The fluid motor 5, the bell crank lever 82, and the rod 64, are so constituted and arranged that when the piston head 97 is disposed in normal raised position, such as shown in FIG. 3, the rod 64 is disposed in such position that the compression coil springs 40 are effective to hold the collar 23 and the plate member 25 in normal position, as shown in FIG. 4, whereby the clutch rings 55 and 57 are disengaged from each other, and the brake rings 33 and 35 are engaged with each other to thereby hold the shaft 14 against rotation.

When it is desired to disengage the brake rings 33 and 35, and engage the clutch rings 55 and 57, the fluid motor 5 may be actuated by feeding a suitable working fluid such as, for example, compressed air, inwardly through a pipe or conduit 103 in the cover member 101 from a suitable source, not shown, to thereby cause the diaphragm 100 to distend downwardly and press the piston head 97 and the piston rod 89 downwardly into position effective to rock the bell crank lever 82 in a clockwise direction around the pin 85 a sufficient distance to pull the rod 64 forwardly through the shaft 14 into position to move the collar 23 and the plate member 25 forwardly into position wherein the collar member 23 is disposed in the aforementioned actuated position forwardly of the position shown in FIG. 4.

Normally, during operation of our novel clutch 1, the drive shaft 43 is constantly rotating, with the driven shaft 14 alternately connected to, and disconnected from the drive shaft 43 during each cycle of operation.

To afford a driving connection between the shaft 14 and the driven shaft 3, a gear 104 is mounted on and keyed to the shaft 14 between the bearings 15 and 16, FIG. 3. The gear 104 is meshed with a gear 105 formed on the rear end portion of a sleeve or hollow shaft 106, which is journalled on a shaft 107 mounted at its rear end in an opening 108 in the housing 4, and its front end in an opening 109 formed in a front end portion 110 of the main body section 7 of the housing 4. The rear end portion of the shaft 107 projects outwardly through the opening 108 and has a shoulder 111 formed on the rear face thereof which is engaged with a portion 112 of the partition wall 9 to thereby hold the shaft 107 in the opening 108 to prevent the leakage of oil rearwardly therepast from the housing 4.

Another gear 114 is formed on the front end portion of the shaft 106 in position to engage a gear 115 mounted on and keyed to the rear end portion of the driven shaft 3, FIG. 3. The front end section 6 of the housing 4 is in the form of a concave-forwardly, substantially cup-shaped housing, including a rear wall 116 through which the driven shaft 3 extends, FIGS. 1 and 3. The driven shaft 3 is journalled in two bearings 117 and 118 in the wall 116, and a suitable oil seal 119 is mounted on the wall 116 around the shaft 3 and forwardly of the bearing 117 to prevent the leakage of oil from the housing 4 around the shaft 3.

The main body section 7 of the housing 4 has a radially outwardly projecting flange 120 on the front end portion thereof, FIG. 3, and the front end section 6 is secured thereto, with the rear face of the wall 116 disposed in juxtaposition to the front end of the main body section 7, by bolts 121 extending through the flange 120 and threadedly engaged in the front end section 6.

When the front end section 6 is secured in such normal position on the main body section 7, the gear 115 is disposed in the housing 4 in meshing engagement with the gear 114, and the front end portion 122 of the driven shaft 3 projects forwardly from the housing 4, FIGS. 1 and 3. The front end portion 122 of the shaft 3 is suitably formed so that it may be quickly and easily connected to any suitable member which is to be driven thereby, the front end portion 122 being shown in the drawings with a key-way 123 formed therein so that the shaft 3 may be connected into another shaft, gear, or the like, not shown, by a keyed connection. Hence, it will be seen that upon rotation of the shaft 14 by the drive shaft 43, the shaft 14 through the gear 104, the gear 105, the shaft 106, the gear 114, and the gear 115, is effective to rotate the shaft 3 to thereby afford a drive for anything connected to the shaft 3.

The front end section 6 of the housing 4 has a bottom wall 124, which projects forwardly from the rear wall 116, FIGS. 1, 2 and 3. The bottom wall 124 has a plurality of openings 125 extending vertically therethrough, and may be mounted on a suitable mounting member 126, such as, for example, a mounting bracket, or the like, on a machine, not shown, to be driven by the shaft 3 of the clutch 1. To hold the clutch 1 stationary on such a mounting member 126, bolts 127 may be inserted downwardly through the openings 125 and threadedly engaged in the mounting member 126.

In the operation of our novel clutch 1 shown in the drawings, rotation of the drive shaft 43 is effected by a motor 128 which is operatively connected to the flywheel 46 by a belt 129, to thereby effect rotation of the flywheel 46 and, therefore, the drive shaft 43 during operation of the motor 128.

The motor 128 is preferably supported from the transmission unit 1, and to effect this mounting of the motor 128 on the transmission unit 1, we prefer to use a mounting bracket 130 extending across the upper portion of the motor 128 and connected thereto by suitable means such as, for example, welding, FIGS. 2 and 3. At one end, the bracket 130 has two ears 131 and 132 projecting upwardly therefrom which are pivotally mounted on a pin 133 which extends through and is supported by two plates 134 and 135 welded to the housing 4 and depending therefrom. A bolt 136 which is mounted in, and supported by a boss 137 on the side of the rear section 8 of the housing 4, FIGS. 1 and 5, extends downwardly through the other end of the mounting bracket 130, and the latter is adjustably supported on the bolt 136 by two nuts 138 and 139 disposed in clamping relation to the bracket 130. With this construction, the tension on the belt 129 may be controlled by adjusting the nuts 138 and 139 upwardly and downwardly to thereby pivot the motor 128 upwardly or downwardly around the pin 133.

When the motor 128 is running, it is effective through the belt or belts 129 to rotate the flywheel 46 and thereby rotate the shaft 43. It will be remembered that normally the piston 89—97 of the fluid motor 5 is disposed in the position shown in FIG. 3, wherein the bell crank lever 82 is effective to hold the rod 64 in such position that the collar 23 and the plate member 25 are disposed in the position shown in FIG. 4, wherein the clutch rings 55 and 57 are disengaged from each other, and the brake rings 33 and 35 are clampingly engaged with each other. With this positioning of the parts, the shaft 14 is held against rotation by the brake rings 33 and 35, but the shaft 43 is free to rotate relative thereto.

When it is desired to couple the shaft 14 to the shaft 43 to thereby drive the driven shaft 3, working fluid may be fed into the fluid motor 5 through the conduit 103 to thereby move the piston rod 89 downwardly. Such movement of the piston rod 89 is effective to rotate the bell crank lever 82 in a clockwise direction as viewed in FIGS. 3 and 8, around the pin 85 to thereby move the rod 64 forwardly, or to the left as viewed in FIGS. 3 and 4. This movement of the rod 64 is effective to move the collar 23 and the plate member 25 to the left a sufficient amount to move the collar 23 into the aforementioned forward position, to thereby disengage the brake rings 33 and 35 and engage the clutch rings 55 and 57. Such movement of the parts is effective to release the shaft 14 for rotation, and to couple the shaft 14 through the clutch rings 55 and 57, to the shaft 43.

When it is again desired to disconnect the driven shaft 3 from the motor 128, the working fluid in the fluid motor 5 may be vented outwardly such as, for example, through the conduit 103, and the springs 40 are then effective to move the collar 23, the plate member 25 and the rod 64 to the right into their original position as shown in FIG. 4 to again disengage the clutch rings 55 and 57 and engage the brake rings 33 and 35 and thereby hold the shaft 14 against rotation while permitting the shaft 43 to continue its rotation.

Our novel transmission unit 1 is so constructed that, in operation, it may be effectively air-cooled. However, for lubrication, and to assist in the cooling of the internal parts of the transmission unit 1, the housing 4 is preferably filled with suitable lubricating oil to a level adjacent the bottom of the shaft 14. The oil may be fed into the housing 4 in any suitable manner, such as, for example, by pouring the same into the housing 4 through the opening 96, FIG. 3. A suitable drain, such as a removable drain plug 140, FIG. 3, may be embodied in the housing 4 for draining the oil therefrom when it is desired to do so.

It will be seen that in the operation of our novel transmission unit 1, with the housing 4 filled with oil to the aforementioned level, the brake rings 33, the clutch rings 55, the collar 23, the plate member 25, and the gears 104, 105 and 114, during the rotation thereof, rotate through the oil in the bottom of the housing 4 and act as splash rings to thereby throw the oil upwardly into the housing 4 and bathe all parts therein in oil. This bathing of the parts of the transmission unit 1 affords effective lubrication therefor and, in addition, assists in cooling the internal parts of the transmission unit 1.

From the foregoing, it will be seen that we have afforded a novel transmission unit wherein the parts thereof are constituted and arranged in a novel and expeditious manner.

Also, it will be seen that we have afforded a novel transmission unit which is constructed, and is operable, in a novel and expeditious manner.

In addition, it will be seen that we have afforded a novel transmission unit which may be used, and sold as a self-contained accessory, adapted for use in driving any one of a number of machines.

Also, we have afforded a novel transmission unit which is effective and efficient in operation and may be readily and economically produced.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. A drive mechanism adapted to be mounted on the outside of a machine for driving the latter and comprising a housing, a drive shaft rotatably mounted in said housing, means for rotating said drive shaft, one driven shaft mounted in said housing in axial alignment with said drive shaft, a second driven shaft connected to said one driven shaft and rotatable thereby upon rotation of said one driven shaft, a sleeve member mounted on and rotatable with one end of said one driven shaft in outwardly concentric relation thereto, brake rings and clutch rings mounted on said sleeve member for rotation therewith, said rings being slidable on said sleeve member axially of said one driven shaft, other brake rings non-rotatably mounted in said housing and interleaved between said first mentioned brake rings, other clutch rings mounted on and rotatable with said drive shaft, said other clutch rings being movable axially of said drive shaft and interleaved between said first mentioned clutch rings, two abutment members mounted on said sleeve member on opposite axial sides thereof and of all said rings, said abutment members being slidable as a unit axially of said one drive shaft between one position, wherein they are effective to engage said first mentioned brake rings with said other brake rings and to disengage said first mentioned clutch rings from said other clutch rings to thereby hold said one driven shaft against rotation, and another position, wherein they are effective to disengage said first mentioned brake rings from said other brake rings and to engage said first mentioned clutch rings with said other clutch rings to thereby free said one driven shaft for rotation and operatively connect the latter to said drive shaft for rotation thereby, and means for selectively moving said abutment members between said one position and said other position, said last mentioned means comprising a rod connected to said abutment members and slidably mounted in said one driven shaft for reciprocation axially of the latter, a lever pivotally mounted in said housing and connected to said rod, another housing mounted on said first mentioned housing, a piston reciprocably mounted in said other housing and connected to said lever for oscillating the latter upon reciprocation of said piston, and means including a distensible diaphragm in said other housing for reciprocating said piston.

2. A transmission unit comprising a housing, a drive shaft rotatably mounted in said housing, a driven shaft rotatably mounted in said housing in axial alignment with said drive shaft, brake rings mounted around said driven shaft in position to hold said driven shaft against rotation when said brake rings are operatively engaged with each other, clutch rings mounted around said driven shaft, certain of said clutch rings being connected to said drive shaft for rotation therewith, and the remainder of said cltuch rings being connected to said driven shaft for rotation therewith, abutment means mounted on and connected to said driven shaft for rotation therewith, said abutment means being disposed on both sides of all of said rings axially of said driven shaft and being reciprocable as a unit longitudinally of said driven shaft, and means operable to reciprocate said abutment means axially of said driven shaft to simultaneously engage said brake rings and disengage said clutch rings during one stroke of said reciprocation, and to simultaneously disengage said brake rings and engage said clutch rings during the other stroke of said reciprocation, said last named means comprising a rod reciprocably mounted in and projecting from said driven shaft, said rod extending through all of said abutment means and being secured to the abutment means on the opposite side of said rings from said driven shaft, and means for reciprocating said rod in said driven shaft.

References Cited in the file of this patent

UNITED STATES PATENTS

| | | |
|---|---|---|
| 1,624,174 | Lucarelle et al. | Apr. 12, 1927 |
| 2,019,146 | Livermore | Oct. 29, 1935 |
| 2,039,128 | Tiedemann | Apr. 28, 1936 |
| 2,089,733 | Criley | Aug. 10, 1937 |
| 2,175,383 | Eason | Oct. 10, 1939 |
| 2,614,396 | Ratermann | Oct. 21, 1952 |
| 2,625,247 | Shurts | Jan. 13, 1953 |
| 2,791,130 | Broughner | May 7, 1957 |
| 2,838,149 | Burton | June 10, 1958 |
| 2,903,108 | Ochtman | Sept. 8, 1959 |
| 2,908,369 | Frey et al. | Oct. 13, 1959 |
| 2,932,372 | Gehrer et al. | Apr. 12, 1960 |